Nov. 5, 1963   J. L. LUTTRELL   3,109,309
ACCELERATION AND VELOCITY METER
Filed Jan. 19, 1962

INVENTOR.
JOHN L. LUTTRELL

BY
*Q. E. Hodges*
*Frank P. Presta* ATTYS.
AGENT.

United States Patent Office 3,109,309
Patented Nov. 5, 1963

3,109,309
ACCELERATION AND VELOCITY METER
John L. Luttrell, Silver Spring, Md., assignor to the United States of America as represented by the Secretary of the Navy
Filed Jan. 19, 1962, Ser. No. 167,453
13 Claims. (Cl. 73—492)
(Granted under Title 35, U.S. Code (1952), sec. 266)

The invention described herein may be manufactured and used by or for the Government of the United States of America for governmental purposes without the payment of any royalties thereon or therefor.

This invention relates to apparatus for the measurement and recording of an impact or acceleration and more particularly to an accelerometer wherein small weights are lightly suspended at different known distances from calibrated deformable targets such that the parameters of an impact or acceleration may be measured and recorded.

The prior art devices for measuring an impact or acceleration have measured and recorded only the peak acceleration or deceleration or have been complicated and expensive. The devices which have provided the information for determining all of the parameters of an acceleration or deceleration have required either electrical connection or telemetering to external recorders, or have contained expensive and delicate electronic or clock-work recording mechanisms. None of the prior art devices have provided a simple means for measuring and recording of the parameters of an impact or acceleration.

It is therefore an object of this invention to provide a simple device of the type described which will measure and record the parameters of an impact or acceleration.

Another object is the provision of a new and improved accelerometer or decelerometer which is compact, inexpensive and rugged.

Still another object is the provision of a new and improved accelerometer or decelerometer which will accurately measure and record the parameters of an acceleration or deceleration in more than one direction.

Figure 1:
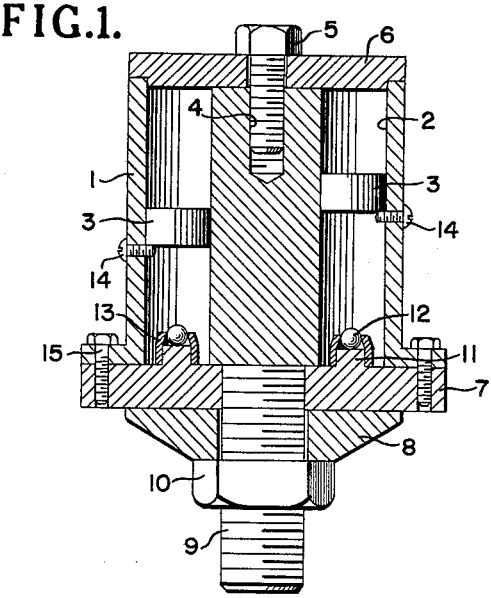
Figure 2:
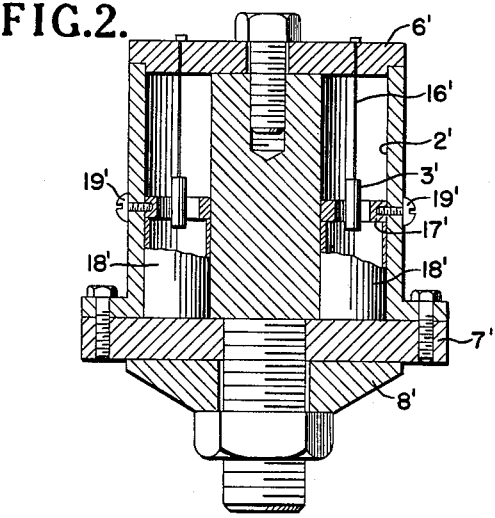

Other objects and various further features of the novelty and invention will be apparent to those skilled in the art from a reading of the following specification in conjunction with the accompanying drawing, which shows, for illustrative purposes only, preferred forms of the invention and in which:

FIG. 1 is a sectional view of the apparatus to be used for a predetermined direction of acceleration; and FIG. 2 is a sectional view of the apparatus to be used when the direction of acceleration cannot be predetermined.

Referring now to FIG. 1, the acceleration or deceleration measurement and recording apparatus comprises a casing 1 having a number of bores 2 therein in which weights 3 may be slideably mounted. The center portion of the casing 1 is provided with a threaded bore 4 into which a bolt 5 may be threaded to secure a cover plate 6 onto the top of the casing 1. The casing 1 is mounted on a base plate 7 by bolts 15 which pass through holes in flanges in the casing 1 and are threaded in the base plate 7. The base plate 7 is in turn mounted on a supporting plate 8 and is attached thereto by a threaded bolt member 9. The bolt member 9 is also threaded so as to receive a nut 10 to provide for the mounting of the entire apparatus on the object which is to be subjected to the acceleration or deceleration.

The base plate 7 is provided with a number of anvils 11 corresponding to the number of bores 2 in the casing 1. The anvils are located such that each one will be in the center of one of the casing bores 2. Balls 12 are mounted on each of the anvils 11 and are retained thereon by thin sleeves 13 substantially as shown. The balls 12 are composed preferably of copper for the reason that such a ball exhibits relatively linear force-deflection characteristics over a wide range of forces applied thereto, although, if desired, a ball composed of aluminum or other soft metal suitable for the purpose may be employed. The weights 3 are retained at various heights within the bores 2 by shear screws 14 which extend into each of the bores 2. The shear screws 14 may be composed of a suitable plastic material such as Teflon which will be sheared by the inertia of the weights 3. The weights employed may be selected on the basis of the acceleration or deceleration range anticipated and the selection will influence both the natural frequency and the sensitivity of the apparatus.

In operation, when the apparatus is subjected to an acceleration or deceleration in the direction of the longitudinal axis of the bores 2, the weights 3 will shear the screws 14 and strike the balls 12. The degree of deformation of each of the balls 12 will provide the speed of impact. This deformation of an individual ball will represent the change in speed of the object on which the apparatus is mounted during the time from the beginning of the acceleration or deceleration until the weight and the ball meet. Since there are several weights at different distances from the respective balls, the change in speed at determinable intervals can be obtained. With the weights and the deformation resistance of the balls being known, the various impact velocities can be computed. The various distances of the weights from the balls, and therefore the difference in distances being known, the time during which the speed changes can be computed. Thus, the acceleration during these intervals can be computed, with the result that the parameters of an acceleration or deceleration can be measured and recorded by the subject apparatus.

Referring now to FIG. 2, a modified form of the invention is shown for use when the direction of the acceleration cannot be predetermined. The weights 3' are suspended by wires 16' attached to the cover plates 6'. Target rings 17' are mounted on supporting members 18' and surround the weights 3'. The rings 17' are retained in position by screws 19' which are threaded through the casing and into the rings. The rings 17' mounted within each of the bores 2' are of varying thicknesses, such that the distances between the weights 3' and inner diameter of the rings 17' will vary to provide for the measurement and recording of the parameters of an acceleration or deceleration. The type of wire 16' to be used will depend on the magnitude of the acceleration or deceleration to be measured, but the wires 16' should be firm enough to avoid contact between the weights 3' and the target rings 17' when the object upon which subject measuring and recording apparatus is mounted is merely jarred. The target rings 17' may be of a suitable material such as copper which exhibits relatively linear force-deflection characteristics over a wide range of forces applied thereto.

In operation, this modified form of the invention will measure and record the parameters of an acceleration or deceleration in any direction other than that which is parallel to the longitudinal axis of the bores 2'. When the apparatus is subjected to an acceleration or deceleration, the weights 3' will strike the target rings 17' in each of the bores 2' at various times during the acceleration or deceleration. Since the weights are at different distances from the target rings, the change in speed at determinable intervals can be obtained, with the result that the parameters of the acceleration or deceleration can be measured and recorded accurately.

Various modifications could be made in the forms of the invention shown; for example, the weights could be made deformable instead of the target balls or rings, the weights in FIG. 1 could be suspended by soft springs or the like, or in the apparatus shown in FIG. 2 the thickness of the target rings could be the same while the diameter of the bores 2' and of the target rings 17' could be varied.

While the invention has been described in detail for the preferred forms shown, it will be understood that modifications may be made within the scope of the invention as defined in the appended claims.

What is claimed as new and desired to be secured by Letters Patent of the United States is:

1. An accelerometer comprising a plurality of equal mass weights and targets, means to yieldably suspend said weights at different distances from said targets, and means to guide said weights into contact with said targets when there is an acceleration force applied to the accelerometer.

2. The apparatus of claim 1 wherein said targets are deformable and composed of a material having relatively linear force-deflection characteristics.

3. The apparatus of claim 1 wherein said weights are deformable and composed of a material having substantially linear force-deflection characteristics.

4. An acceleration and velocity meter comprising a casing having bores therein, a plurality of equal mass weights slideably and respectively mounted in said bores, deformable targets each mounted at one end of each of said bores, and shearable means for yieldably supporting said weights at different distances from said targets, whereby upon application of an acceleration force to the meter sufficient to shear the shearable means said weights contact and deform said targets at different times to provide a measurement of a plurality of parameters of the acceleration.

5. The apparatus of claim 4 wherein said means for supporting said weights comprises shearing screws mounted in said casing and protruding into each of said bores.

6. The apparatus of claim 4 wherein said targets are balls composed of a material having substantially linear force-deflection characteristics.

7. An accelerometer comprising a casing having bores therein, deformable weights of equal mass slideably mounted in said bores, targets mounted at one end of each of said bores, and means for yieldably supporting said weights at different distances from each of said targets, whereby upon acceleration said weights contact and are deformed by said targets at different times to provide a measurement of a plurality of parameters of the acceleration.

8. An acceleration and velocity meter comprising a casing having bores therein, a plurality of equal mass weights slideably mounted within said bores, a base plate upon which said casing is mounted having anvils protruding into a central portion of each of said bores, calibrated deformable balls mounted on said anvils, sleeve members for retaining said balls on said anvils, shearing screws mounted in said casing and protruding into each of said bores to yieldably suspend said weights at different distances from said balls, and means for mounting said meter upon an object to be accelerated, whereby upon acceleration said weights contact and deform said balls at different times to provide a measurement of a plurality of parameters of the acceleration.

9. An accelerometer comprising a casing having bores therein, a plurality of equal mass weights each resiliently supported within a different one of said bores, deformable target rings of different radial thicknesses equal in number to and mounted respectively within said bores, each of said rings surrounding a different one of said weights at a different radial distance therefrom, whereby upon sudden acceleration said weights contact and deform said rings at different times to provide a measurement of a plurality of parameters of an acceleration.

10. The apparatus of claim 9 wherein said weights are resiliently supported within said bores by wires.

11. The apparatus of claim 9 wherein said rings are composed of a material having relatively linear force-deflection characteristics.

12. An accelerometer comprising a casing having bores therein, a plurality of equal mass deformable weights, each of said weights being resiliently supported within a different one of said bores, target rings of different radial thicknesses equal in number to and mounted respectively within said bores, each of said rings surrounding a different one of said weights, whereby upon sudden acceleration said weights contact and are deformed by said rings at different times to provide a measurement of a plurality of parameters of the acceleration.

13. An accelerometer comprising a casing having bores of various sizes therein, a plurality of weights, each of said weights being resiliently supported within a different one of said bores, deformable target rings equal in number to and mounted respectively within said bores, each of said rings surrounding a different one of said weights and having an outer diameter equal to the diameter of said bores, whereby upon sudden acceleration said weights contact and deform said rings at different times to provide a measurement of a plurality of parameters of the acceleration.

References Cited in the file of this patent

UNITED STATES PATENTS

| | | |
|---|---|---|
| 2,454,793 | Grogan | Nov. 30, 1948 |
| 2,455,356 | Crede | Dec. 7, 1948 |
| 2,574,600 | Stokes | Nov. 13, 1951 |
| 2,601,440 | Kerrigan | June 24, 1952 |
| 2,620,652 | Hartmann | Dec. 9, 1952 |
| 2,665,896 | Kirby | Jan. 12, 1954 |